US008649759B2

(12) United States Patent
Scott et al.

(10) Patent No.: US 8,649,759 B2
(45) Date of Patent: Feb. 11, 2014

(54) METHOD OF PROVIDING LOCATION INFORMATION IN AN EMERGENCY

(75) Inventors: Sherryl Lee Lorraine Scott, Waterloo (CA); Earl Friedberg, Waterloo (CA); Jeffrey Charles Bos, Waterloo (CA); Leonid Vymenets, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 615 days.

(21) Appl. No.: 12/361,116

(22) Filed: Jan. 28, 2009

(65) Prior Publication Data

US 2010/0190468 A1 Jul. 29, 2010

(51) Int. Cl.
*H04M 11/04* (2006.01)

(52) U.S. Cl.
USPC .................. 455/404.2; 455/404.1; 455/456.1; 455/456.3

(58) Field of Classification Search
USPC ............. 455/403, 404.1, 404.2, 456.1, 414.1, 455/414.2, 440, 456.3, 457; 726/17, 16
See application file for complete search history.

(56) References Cited

U.S. PATENT DOCUMENTS

| 5,742,666 | A | | 4/1998 | Alpert |
| 5,933,080 | A | * | 8/1999 | Nojima .................... 340/426.19 |
| 6,574,484 | B1 | | 6/2003 | Carley |
| 7,466,235 | B1 | | 12/2008 | Kolb |
| 2002/0131330 | A1 | | 9/2002 | Zion et al. |
| 2003/0076932 | A1 | | 4/2003 | Andrew |
| 2003/0104790 | A1 | | 6/2003 | Ylitalo |
| 2004/0024706 | A1 | | 2/2004 | Leduc |
| 2004/0103000 | A1 | | 5/2004 | Owurowa et al. |
| 2004/0203576 | A1 | | 10/2004 | Droste et al. |
| 2004/0203622 | A1 | | 10/2004 | Esque et al. |
| 2005/0151642 | A1 | * | 7/2005 | Tupler et al. ............. 340/539.18 |
| 2006/0026689 | A1 | | 2/2006 | Barker et al. |
| 2006/0079269 | A1 | | 4/2006 | Sorotzkin |
| 2006/0142057 | A1 | | 6/2006 | Schuler et al. |
| 2006/0172720 | A1 | | 8/2006 | Islam et al. |
| 2007/0102527 | A1 | * | 5/2007 | Eubank et al. ................ 235/492 |
| 2007/0117574 | A1 | | 5/2007 | Watanabe |

(Continued)

FOREIGN PATENT DOCUMENTS

| CA | 2691345 | 7/2010 |
| EP | 1170969 | 1/2002 |

(Continued)

OTHER PUBLICATIONS

Extended European Search Report dated May 20, 2009 Issued in reference to European Patent Application No. 09151569.2.

(Continued)

*Primary Examiner* — Chuong A Ngo
(74) *Attorney, Agent, or Firm* — Finnegan, Henderson, Farabow, Garrett & Dunner LLP

(57) ABSTRACT

A password-protected wireless communications device can send a map or other location information about the current location of the device to the one or more emergency contacts by utilizing an emergency interface element that bypasses a password prompt. The location information may include an address and route directions to the current location of the device. The location information may also include a map of, and directions to, the closest hospital. The device can also render its own map to show a first responder where the closest emergency contact is located or where the nearest hospital or medical service provider is situated.

25 Claims, 8 Drawing Sheets

(56) References Cited

U.S. PATENT DOCUMENTS

| | | | |
|---|---|---|---|
| 2007/0135043 A1 | 6/2007 | Hayes | |
| 2007/0243853 A1 | 10/2007 | Bumiller | |
| 2008/0005301 A1 | 1/2008 | Li | |
| 2008/0070546 A1* | 3/2008 | Lee | 455/404.2 |
| 2008/0080687 A1 | 4/2008 | Broms | |
| 2008/0166992 A1* | 7/2008 | Ricordi et al. | 455/404.2 |
| 2008/0284587 A1 | 11/2008 | Saigh | |
| 2009/0005068 A1 | 1/2009 | Forstall et al. | |
| 2009/0047923 A1 | 2/2009 | Jain et al. | |
| 2009/0205041 A1* | 8/2009 | Michalske | 726/17 |
| 2010/0069099 A1 | 3/2010 | Dunn et al. | |
| 2010/0190467 A1 | 7/2010 | Scott et al. | |
| 2011/0041102 A1 | 2/2011 | Kim | |
| 2011/0088003 A1 | 4/2011 | Swink et al. | |

FOREIGN PATENT DOCUMENTS

| | | |
|---|---|---|
| EP | 2214385 | 8/2010 |
| GB | 2 401 285 | 11/2004 |
| JP | 2004-120467 | 4/2004 |
| WO | 01/41458 | 6/2001 |
| WO | 2004051976 A | 6/2004 |
| WO | WO 2004/054278 A2 | 6/2004 |
| WO | 2004/082190 | 9/2004 |
| WO | 2004/104898 | 12/2004 |
| WO | 2005053337 | 6/2005 |
| WO | 2005/069676 | 7/2005 |
| WO | 2006135120 A | 12/2006 |
| WO | 2007118331 A | 10/2007 |

OTHER PUBLICATIONS

Extended European Search Report dated May 20, 2009 Issued in reference to European Patent Application No. 09151567.6.
European Search Report for EP Application No. 09151568.4
Extended European Search Report for EP 09151568.4 dated Jul. 6, 2009 (9 pages).
Office Action for U.S. Appl. No. 12/361,052 dated Dec. 1, 2011 (12 pages).
Office Action for U.S. Appl. No. 12/361,052 dated Jun. 30, 2011 (8 pages).
Office Action for U.S. Appl. No. 12/361,084 dated Jan. 12, 2012 (9 pages).
Office Action for U.S. Appl. No. 12/361,084 dated Jul. 19, 2011 (10 pages).
Office Action for U.S. Appl. No. 12/361,084 dated Oct. 3, 2011 (9 pages).
"3rd Generation Partnership Project; Technical Specification Group Services and System Aspects; Man-Machine Interface (MMI) of the User Equipment (UE) (Release 7)," 3GPP TS 22.030 v7.0.1 (Jul. 2005).
"I.C.E. (In Case of Emergency) Initiative [Edited]," Cingular Customer Forums, Aug. 4, 2005, Retrieved from http://forums.cingular.com/cng/board/message?board.id=announcements&message.id=206.
"ICE Your Cell Phone for Safety," CBS News, London, Jul. 26, 2005, CBS Broadcasting, Inc., Retrieved from www.cbsnews.com/stories/2005/07/26/earlyshow/printable711715.shtml.
"ICE," Retrieved from http://www.ci.miramar.fl.us/fire/ice.htm on Mar. 31, 2006.
Chaves, Susan, "ICE First application turns cell phones into lifesavers," The Darien Time, Darien, Connecticut, Mar. 16, 2003, Retrieved from http://www.acorn-online.com/news/publish/article_5358.shtml.
Chinese Office Action (with translation) for Chinese Application No. 200780022704.7 dated Feb. 29, 2012 (15 pages).
Coates, Sam, "ICE Cell Phone Plan Would Help Rescuers; Idea to Designate Next of Kin in Electronic Address Book is Gaining Popularity; [Final Edition]," The Washington Post, Jul. 18, 2005, p. A.06, Washington, D.C.
English-language translation of Korean Office Action that issued on Mar. 25, 2010 from corresponding Korean Patent Application No. 10-2008-7027918.
European Office Action for European Application No. 09163500.3 dated Dec. 12, 2012 (6 pages).
Hibbert, David, "Help Out in a Crisis—With ICE," Lockergnome LLC, Jul. 14, 2005, Retrieved from www.channels.lockergnome.com/mobile/archives/20050714_help_out_in_a_crisis_with_ice.phtml.
MacInnes, Alexander, "Safety campaign urges storing contact numbers on cellphones," Herald News, Aug. 3, 2005, North Jersey Media Group (2005), Retrieved from www.northjersey.com.
Meyers, Michelle, "ICE your cell phone," CNET News.com, Jul 19, 2005, Retrieved from http://news.com.com/2061-10800 3-5795310.html.
Morrison, Michael, "Blackberry in a SnapR," Jul. 1, 2005, Sams, XP007904690 ISBN: 0-672-32670-1.
U.S. Advisory Action for related U.S. Appl. No. 12/361,052, dated Sep. 10, 2012 (3 pages).
U.S. Advisory Action for related U.S. Appl. No. 12/361,084, dated Feb. 23, 2012 (3 pages).
U.S. Advisory Action for related U.S. Appl. No. 12/361,084, dated Nov. 14, 2012 (2 pages).
U.S. Office Action for related U.S. Appl. No. 12/361,052, dated Apr. 25, 2012 (8 pages).
U.S. Office Action for related U.S. Appl. No. 12/361,052, dated Jul. 3, 2012 (9 pages).
U.S. Office Action for related U.S. Appl. No. 12/361,084, dated Aug. 27, 2012 (10 pages).
U.S. Office Action for related U.S. Appl. No. 12/361,084, dated May 15, 2012 (9 pages).
U.S. Office Action for related U.S. Appl. No. 13/551,386, dated Dec. 10, 2012 (14 pages).
U.S. Office Action for related U.S. Appl. No. 13/616,297, dated Nov. 15, 2012 (11 pages).
Zatz, Arline, "Star of Life," Rescue-EMS Magazine, Jul./Aug. 1992, Retrieved from www.angelfire.com/co/fantasyfigures/staroflife.html.
Hallburn, Mark, "Putnam County Debuts ICE Program," Putnamlive.com, Dated Dec. 10, 2005 Retrieved from the Internet URL:http://web.archive.org/web/20051210102349/http://putnamlive.com/PutnamCountyDebutsICEProgram.html.

* cited by examiner

METHOD OF PROVIDING LOCATION INFORMATION IN AN EMERGENCY

CROSS-REFERENCE TO RELATED APPLICATIONS

This is the first application filed for the present technology.

TECHNICAL FIELD

The present technology relates generally to mobile devices and, in particular, to mobile devices having a positioning system or other location-determining capability.

BACKGROUND

Wireless communications devices (e.g. cell phones, smart phones, personal digital assistants, wireless-enabled tablets, or other types of mobile communication devices) are becoming ubiquitous. These wireless communications devices enable users to communicate (e.g. by voice, e-mail, text messages), to browse the Web, to calendar events, to store an address book of contacts, and to perform myriad other tasks.

Wireless communications devices can also be used to store personal information about the owner of the device, such as the name and alternate phone number of the owner in case the device is lost. In other instances, wireless communications devices have been used to store emergency information, sometimes referred to as In Case of Emergency ("ICE") information. For example, a device may store be used to identify a contact in the user's address book as an emergency contact person. One approach for doing so is to identify the contact with the acronym "ICE" prior the entry. So, for example, a contact John Smith would be listed as ICE—Smith, John in the address book to signify that John Smith is an emergency contact person for the owner of the device. The main problem with this approach is that it is not universally accepted and many first responders would not necessarily know what "ICE" or any other such designation means. A greater problem, however, is that the address book is typically only accessible by a user who has the password to the device. Thus, without knowledge of the password, the first responder cannot gain access to the emergency information stored within the device. Furthermore, since the way to access an address book varies from device to device, it may not be immediately apparent to the first responder how to quickly check the address book for emergency contacts.

One solution to this problem is provided by Warden Security. A login screen with a password prompt briefly presents a small amount of emergency information such as the name of a contact person to be called in case of emergency, the relationship of the contact person to the owner of the device, and some rudimentary health-related information (such as the owner's blood type). However, since only a very limited amount of emergency information is made available to the first responder, the usefulness of this prior-art technology is minimal.

A further problem is that the emergency contact, even if responsive to the emergency call from the first responder, may not be immediately familiar with the location where the accident has occurred or where the device owner is lying in distress. Furthermore, the contact person may not know the location of the medical service provider or hospital where the device owner is being brought for medical care. A related problem is that the first responder may not know which of the emergency contacts is closest to the scene or which hospital, clinic or other medical service provider is closest. In view of the many shortcomings of the prior art, improvements would be highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
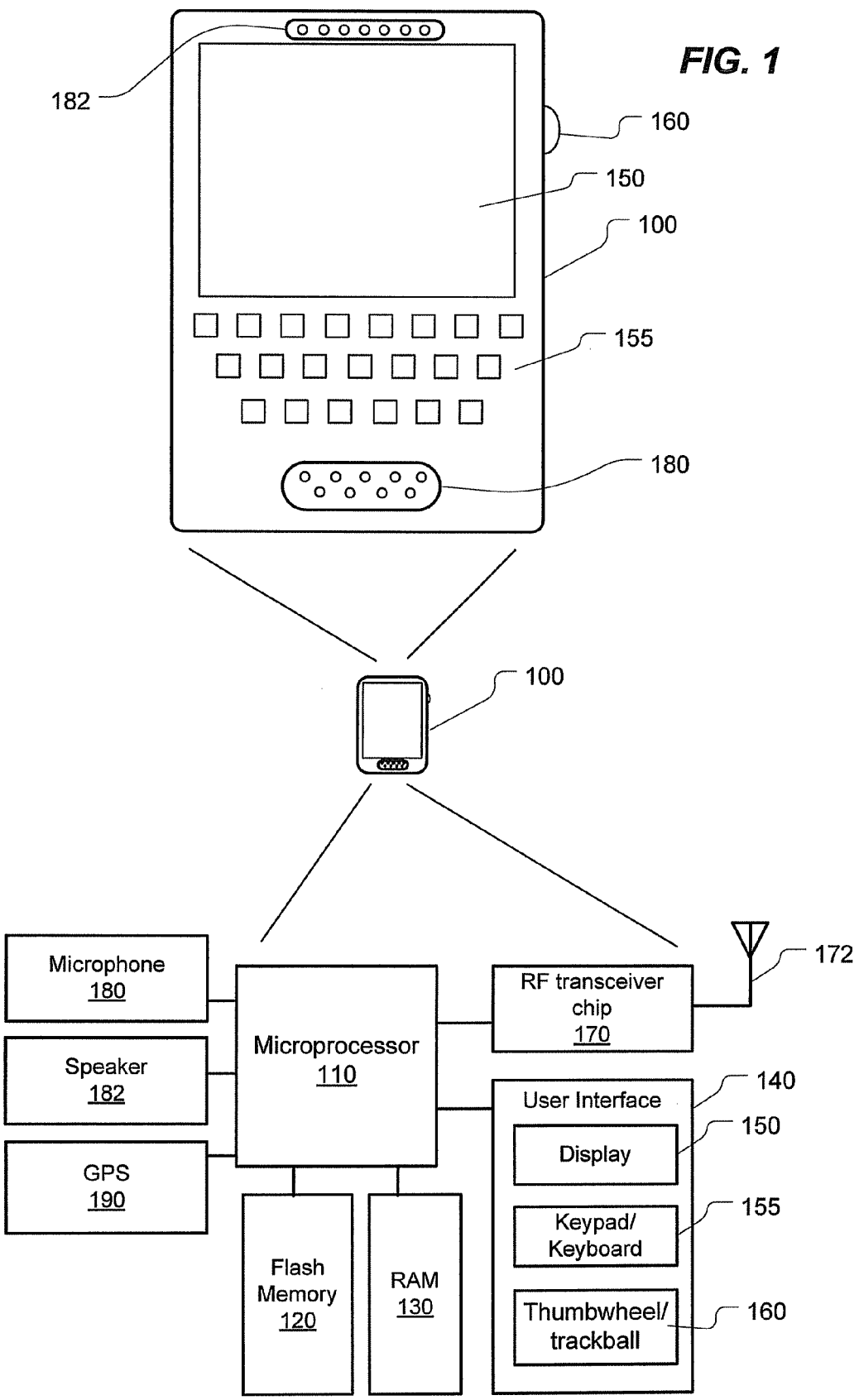
FIG. 1 is a schematic depiction of a wireless communications device in which the present technology can be implemented.

In general, the present technology provides a method, computer readable medium and wireless communications device for sending location information such as, for example, a map, route directions, a street address, etc. to one or more emergency contacts. Another aspect of the present technology enables a first responder to quickly view a map of the current location and/or of the locations of the emergency contacts and/or of a closest medical service provider (hospital, medical center, doctor's office, etc.) The ability to instantly provide a map for a first responder or to send a map to an emergency contact greatly facilitates the emergency response.

Thus, a main aspect of the present technology is a method of using a wireless communications device to provide location information in an emergency. Location information, e.g. a map, can be provided to the first responder by displaying a map on the display of the device or by sending the location information (e.g. the map) to one or more emergency contacts. The method entails determining a current location of the wireless communications device, and displaying a user interface element which when selected causes the wireless communications device to send location information about the current location of the wireless communications device to the one or more emergency contacts displayed by the device to thereby apprise the one or more emergency contacts of the location of the emergency. The method may also entail displaying emergency contact information for one or more emergency contacts. The location information can be presented in the form of a map and may optionally include route directions, address information or other types of information relevant to the relative position of the owner and the emergency contacts. In other words, this is a method of enabling a first responder to use a locked or password-protected wireless communications device to view location-related emergency information or to send emergency information to predetermined emergency contacts.

Another main aspect of the present technology is a computer readable medium comprising code which when loaded into memory and executed on a processor of a computing device is adapted to perform the steps of the preceding method.

Yet another main aspect of the present technology is a wireless communications device having a processor operatively coupled to a memory for receiving and storing emergency contact information for one or more emergency contacts. The device has a location-determining subsystem (for example, but not necessarily, a GPS chipset) for determining a current location of the device. The device also has a display operatively coupled to the memory and processor for displaying a user interface element which when selected causes the wireless communications device to send location information about the current location of the wireless communications device to the one or more emergency contacts displayed by the device to thereby apprise the one or more emergency contacts of the location of the emergency. The device may also display emergency contact information for the one or more emergency contacts.

The details and particulars of these aspects of the technology will now be described below, by way of example, with reference to the attached drawings.

FIG. 1 depicts schematically a wireless communications device 100 on which the present technology can be implemented. For the purposes of this specification, the expression "wireless communications device" is meant to encompass a broad range of electronic communication devices that have processors and memory and which are capable of wireless ("over-the-air") communication. Accordingly, "wireless communications device" is meant to encompass wireless-enabled laptops, tablet PCs, portable, handheld or mobile electronic devices such as smart phones, cell phones, satellite phones, and wireless-enabled PDA's, etc., or any hybrid or multifunction device that has a radio-frequency (RF) transceiver.

Referring to FIG. 1, each wireless communications device 100 includes a microprocessor 110 or central processing unit (or simply a "processor") and a memory for storing data. The memory may include both a Flash memory 120 and a random access memory (RAM) 130. Each wireless communications device 100 also has a user interface 140 that includes a display (graphical user interface—GUI) 150, e.g. an LCD screen, a keyboard/keypad 155 and an optional thumbwheel/trackball 160. Each wireless communications device 100 includes an RF transceiver chip 170 for wireless communications, i.e. receiving and transmitting both voice and data over separate channels. For voice communications, the wireless communications device 100 has a microphone 180 and a speaker 182.

In addition, as shown schematically in FIG. 1, the wireless communications device 100 may include a Global Positioning System (GPS) chipset for obtaining position fixes from orbiting GPS satellites. References to GPS are meant to also include Assisted GPS or Aided GPS.

Although the present disclosure refers expressly to the "Global Positioning System" or "GPS", it should be understood that the term "GPS" is being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system. In lieu of, or in addition to, GPS, the wireless communications device may use another type of location-determining subsystem. Although GPS is the best way presently known for obtaining a current position fix, a different type of positioning subsystem or location-determining subsystem can be used, e.g. a radiolocation subsystem that determines its current location using radiolocation techniques, as will be elaborated below. In the main implementation, though, the GPS chipset 550 receives and processes signals from GPS satellites to generate latitude and longitude coordinates, thus making the device "location aware".

In lieu of, or in addition to, GPS coordinates, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. As will be appreciated, current location information of varying granularity can also be obtained from other sources (HLR/VLR), base station ID, etc.

Figure 2:
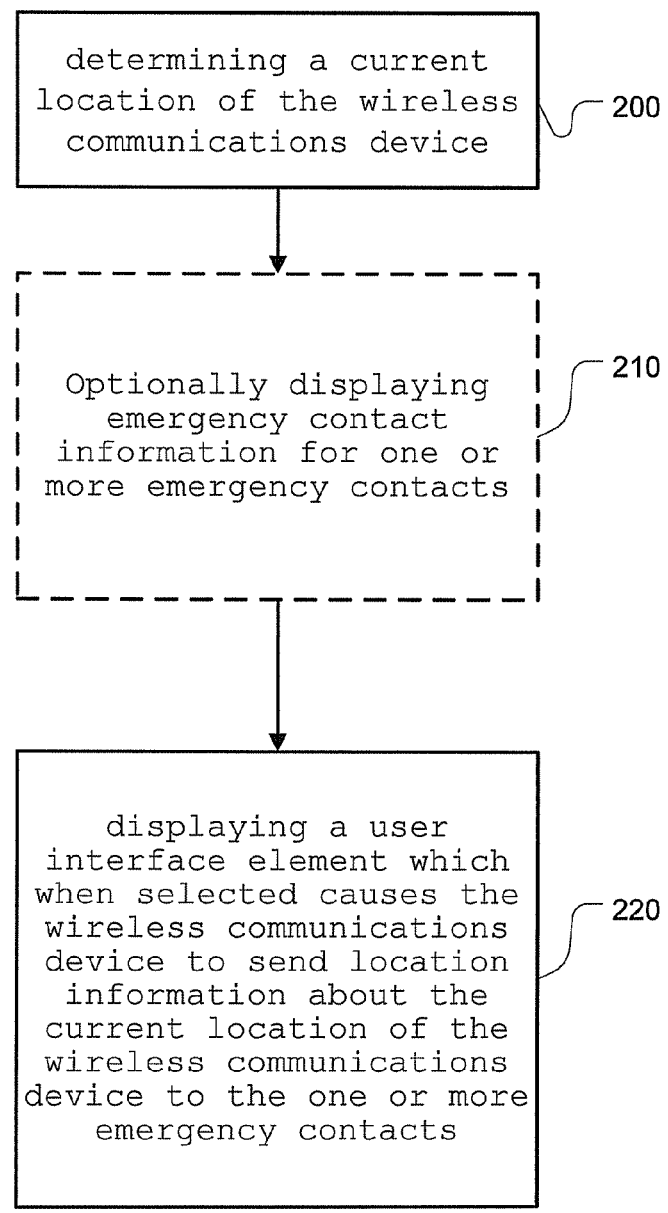
FIG. 2 is a flowchart outlining some of the main steps of a method of sending location information to one or more emergency contacts in accordance with one or more implementations of the present technology.

FIG. 2 is a flowchart outlining some of the main steps of an exemplary method of providing location information in an emergency situation. In the implementation presented in FIG. 2, the current location of the device is determined (at step 200). At optional step 210, emergency contact information for one or more emergency contacts may be displayed on the device, depending on how the device is configured. This emergency contact information can be optionally displayed on an emergency information screen accessible by a first responder without requiring foreknowledge of the device's password. This emergency information screen may thus be accessed by clicking on a link, button, icon or other user interface element visible from the main login screen. Alternatively, this emergency contact information may even be presented directly on the main login screen. In any event, the first responder can access the emergency contact information even if the device is locked out.

It should furthermore be noted that step 200 and optional step 210 are not necessarily sequential (i.e. they can be done in parallel). In other words, in typical operation, the device periodically obtains position fixes when the GPS chipset is on (or when the other location-determining subsystem is active). With respect to the emergency contact information, it should be understood that this is not necessarily displayed onscreen all the time. Rather, it may be displayed only when the screen is active (not in sleep mode) and the device is locked out (in the case where it appears on the login screen) or, alternatively, it may only be displayed if the emergency information screen is accessed by a first responder via the main login screen (e.g. clicking on an emergency contacts link). In addition to presenting the emergency contact information, the device presents a user interface element, e.g. on the same screen as the emergency contact information, but not necessarily so, to enable a first responder to send a map of the current location to one or more of the emergency contacts displayed by the device. Accordingly, this novel method requires that the current location be known and that emergency contacts be presented along with an interface element for enabling the first responder to provide (i.e. either display or send) a map or other location information regarding the current location of the device.

In a variant of the method depicted in FIG. 2, the user interface element, when selected, can be configured to cause a map to be rendered onscreen showing the first responder where he or she is presently situated (rather than sending a map to one or more of the emergency contacts showing them where the owner is situated). In this variant, the location information is provided to the first responder in the form of a map, address or other information rendered onscreen on the device's display.

In each variant, the map can show, for example, the current location of the device, the nearest hospital and the respective locations of each of the emergency contacts. Optionally, the map may include a user interface element for getting route directions to one or more of the identified locations depicted on the map. These features will be described in greater detail below with regard to FIG. 7 and FIG. 8.

In another main implementation of the technology, the method further entails periodically updating the location information and automatically sending the updated location information to the one or more emergency contacts. The device can be configured to send periodic updates every 30 seconds, 1 minute, 5 minutes, 10 minutes, etc. to keep the emergency contacts apprised of the location of the owner. This is particularly useful when the device's location is changing, e.g. the owner and his device are being transported, e.g. via ambulance, to a hospital. From the regular location updates, the emergency contacts can then determine whether they should proceed to the original site or detour to another location (e.g. the hospital).

In another implementation, the method may further entail estimating a travel time between the current location of the device and the location of each of a plurality of emergency contacts and prioritizing the plurality of emergency contacts based on travel time to the current location of the device. This instantly identifies for the first responder the emergency contact who is able to reach the scene in the shortest amount of time. The shortest travel time can be computed using fastest-path algorithms known in the navigation art. In a variant, the device could prioritize the emergency contacts in terms of shortest distance instead of shortest travel time.

The emergency contacts and the user interface elements that enable a first responder to view or send a map or other location information can be grouped together on an emergency information screen which can be accessed via a main login screen such as the one presented by way of example in FIG. 3, the details of which will be elaborated below. The emergency information screen can be presented as part of a main login screen of the device. (The main login screen as the term is used herein is the first screen that the device presents and typically includes a password prompt, biometric check or other security means for restricting access to the device and the data stored therein. The emergency information screen can also be a separate screen that is linked to a user interface element on the main login screen of the device. This user interface element (e.g. button or link, etc.) enables direct access to the emergency information screen by bypassing a password prompt on the main login screen. The emergency information screen, as will be elaborated below, presents a variety of useful emergency-related information that might be used by the first responder in case of an emergency. For example, as will be elaborated below, this emergency information may include (in addition to the emergency contact information) owner information comprising personal information about an owner of the device, medical information about the owner, next-of-kin information (optionally prioritized in terms of proximity to the current location of the device), and/or travel-specific information, wherein the travel-specific information is optionally dynamically updated by the device based on the current location of the device. For the purposes of this specification, the term "owner" is meant to include not just the proprietor of the device but also the main user of the device.

The innovative features of the present invention will be described in greater detail below. However, before delving into these details, it is important to note that the emergency information is presented such that it is made accessible to a first responder without any knowledge of the password or login. In other words, while access to an address book or other data on the device usually requires inputting a password at a password prompt on a login screen, this emergency information is accessible from the login screen (or "main screen"). The information can be presented wholly or partially on the login screen (main screen) or a link, button or other user interface element can be provided to enable the first responder to access this information (thus bypassing the login or password prompt). For the purposes of this specification, the expression "first responder" includes not only a paramedic, doctor, nurse, emergency room worker, ambulance driver, emergency medical technician, etc., but also any other person who comes to the rescue of the owner of the wireless communications device in the event of an emergency.

Figure 3:
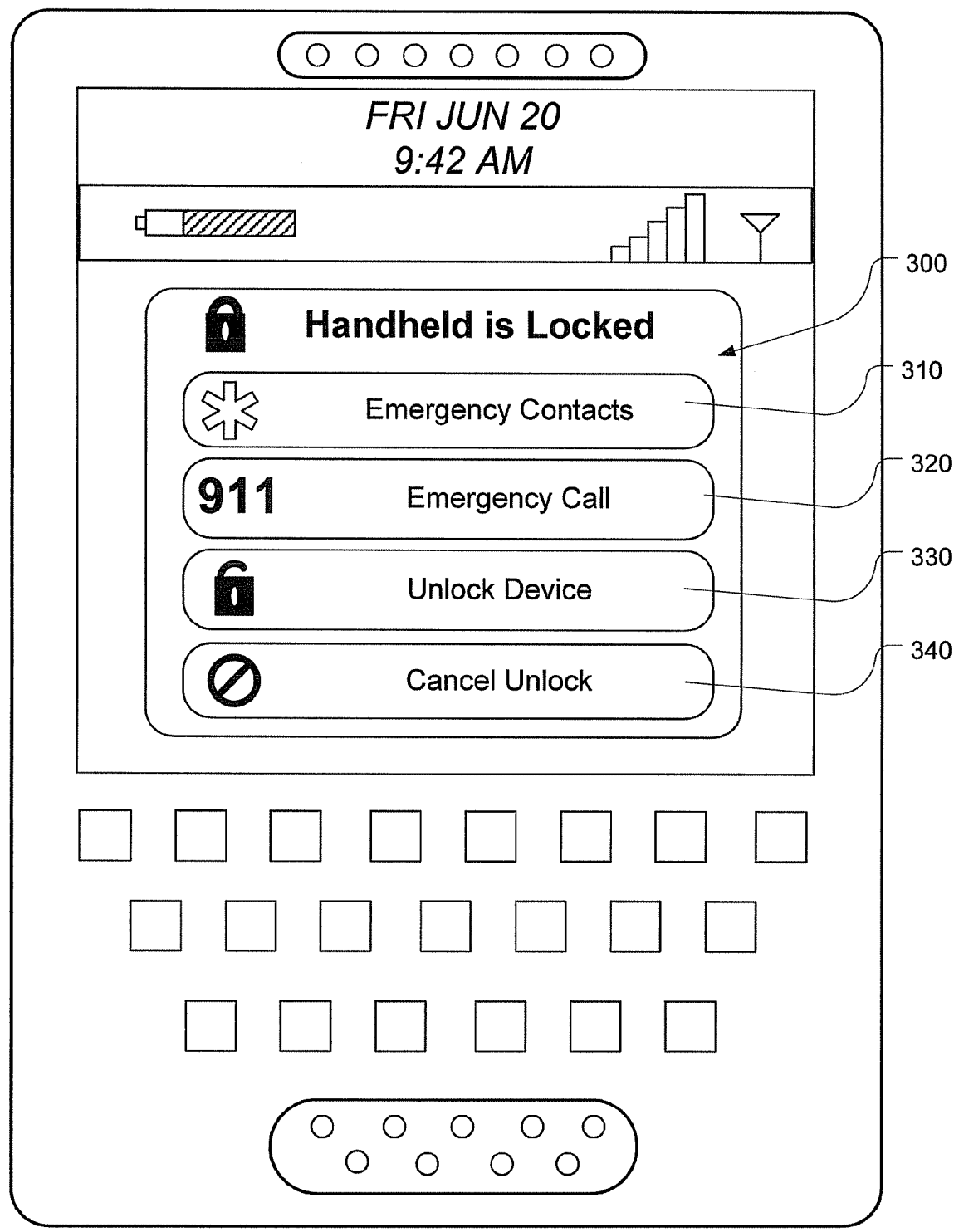
FIG. 3 schematically depicts a wireless communications device displaying, by way of example, a login screen that presents user interface elements for accessing emergency contacts, placing an emergency call, unlocking the device, or cancelling the unlocking of the device.

FIG. 3 schematically depicts a wireless communications device displaying, by way of example, a main login screen 300 that presents user interface elements 310-340 for accessing emergency contacts, to place an emergency call, or to unlock the device by entering a password, fingerprint scan or by some other secure means. As depicted in FIG. 3, the login screen 300 has a first user interface element 310 for accessing and contacting Emergency Contacts, a second user interface element 320 for making an Emergency Call (e.g. dialing 911, 999, 112 or whatever the local emergency number happens to be), a third user interface element 330 for unlocking the device (which leads to a password prompt or biometric input, etc.), and a fourth user interface element 340 to cancel the unlocking of the device. As will be appreciated, the first user interface element 310 for "Emergency Contacts" could be replaced with one that reads more generically "Emergency Information". Whatever the label, the user interface element (e.g. a button, link, hot key, keypad sequence, etc.) provides access to emergency information without requiring that the password be entered. Thus, a first responder can pick up the owner's wireless device and from the main login screen click on the Emergency Contacts button 310 in order to get a list of people to contact in case of emergency as well as other emergency information about the owner of the device.

As further depicted by way of example in FIG. 3, the Emergency Contacts button 310 may have a universally recognizable emergency information icon/symbol 310. As shown in this example, the Blue Star of Life (also known simply as the Star of Life) can be used since this is a generally recognizable emergency medical care symbol. The Star of Life is a six-barred cross, as shown in the figure. A different graphical indicator (e.g. another symbol, logo, word, letter, or abbreviation) could be used in lieu of the Star of Life to indicate that emergency information is available for the first responder.

This novel technology therefore enables the usual lockout/password screen to be bypassed by a first responder so that the first responder can access ICE information stored in a memory of the device or on a SIM card inserted into the device. While the device normally requires a password or other login credentials to access information on the device, the ICE information is made accessible to any first responder while protecting the privacy of all other information on the device. Non-ICE information, e.g. personal address book, e-mails, etc. is kept private assuming the device was locked when ICE information is first accessed. In other words, there is separation of the device-locking and the ICE-access functions, so that access to ICE does not compromise the basic device security and/or compromise SIM security.

Man-machine user interface events may be designated to unlock ICE information to thus bypass the normal login requirement. For example, pressing a "*" key (asterisk or 'star of life') three or four times, or holding a "*" key (asterisk or 'start of life') for two seconds. Advantageously, the asterisk has some similar characteristics as the 'star of life', and is common to many keyboards; the asterisk is a required key according to 3GPP specification. Pressing four times is a preferred implementation since pressing three times could be used for supplementary service codes according to the 3GPP specifications. To provide an increased ease of use, when the device is a cell phone and is in the locked state or idle state (and not accepting supplementary service codes), three "*" (asterisks) or 'star of life' presses also opens the device to the ICE information: such shortened code does not interfere with the potential use of three asterisks for supplementary service codes since these codes can only be entered when the cell phone is in an unlocked state. As some devices do not have a keypad, there may not be the "*" key available. Examples of such devices include MP3 players and other portable music devices, and cell phones for children that do not have a cell phone keypad but use a specially-adapted user interface. Such devices typically have some form of man-machine interface that allows access to menus. In those cases ICE information can be positioned as a menu item.

The emergency information screen can be set up by the owner of the device using an ICE setup wizard for inputting various pieces of emergency information and for designating contacts in the address book as the emergency contacts (or as the In Case of Emergency "ICE" contacts). This ICE setup wizard can facilitate the task of setting up the In Case of Emergency (ICE) information on the device. Optionally, the setup of the device can be configured such that the user is prompted to enter ICE information when the device is first set up. The ICE setup wizard leads the user/owner through various screens to ensure that all important personal information and medical information is inputted, and that emergency contacts are designated from amongst the plurality of contacts listed in the address book. The device may optionally only present the Emergency Contacts button 310 shown in FIG. 3 if the ICE information has been entered. If no information has been entered, the main login screen shown in FIG. 3 can show the Emergency Contacts greyed out or simply absent from the screen. This will preclude the first responder from wasting precious time searching in the device for ICE information if no such information has been entered.

In addition to designated emergency contacts, the emergency information screen may include other relevant pieces of emergency-related information such as, for example, (i) owner information, (ii) medical information, (iii) next-of-kin information and (iv) travel-specific information. In certain implementations, the next of kin information may be subsumed within the emergency contacts (i.e. treated as the one and the same). Alternatively, the device may enable the user/owner to specify one or more next of kin distinct from the emergency contacts per se.

For example, the owner information may include first name, last name, work number, home number, mobile number, pager number, fax number, other number(s), PIN number, home address (street, city, state/province, ZIP/postal code, country), webpage, and other notes.

For example, the medical information may include health issues, medication, medic alert, medical history, allergies, blood type, personal/religious restrictions, organ donation and other notes.

For example, emergency contact person information (or next-of-kin information) may include the contact's (or next-of-kin's) first name, last name, work number, home number, mobile number, pager number, fax number, other number(s), PIN number, home address (street, city, state/province, ZIP/postal code, country), webpage, and other notes.

For example, the travel-specific information, which may be entered e.g. prior to embarking on a trip, may include the name of the tour company, the tour guide, his or her mobile number, work number, e-mail address, travel dates, travel itinerary, consulate/embassy contact information.

A further time-dependent and/or location-dependent trigger may be added to ensure that the travel-specific information is only presented if the GPS chipset provides a location reading that concords with the itinerary and if the time and date correspond to the travel dates. When the trip is over, the user can manually delete the travel-specific information. Alternatively, the device can automatically delete its travel-specific information by intelligently observing that the date and time and/or GPS position fix no longer concord with the travel dates and/or travel destinations. A further feature may be provided to enable a user to specify that travel-specific information is to be retained. This is useful, for example, in the case where a device owner travels frequently to the same destination. For example, if the device owner travels frequently to a certain city, the travel-specific information about that city (preferred contacts in that city, preferred hospital in that city, etc.) can be retained in the device.

In a variant, in addition to any travel-specific information, the wireless device can store location-dependent emergency information. Location-dependent emergency information provides emergency information based on the current location of the device. For example, a user who spends a substantial amount of time in two or three different cities may wish to specify emergency information for each of the different cities.

When in City A, the emergency contact persons may be persons A1 and A2 whereas in City B his contacts are persons B1 and B2. Similarly, the emergency contact information may specify one hospital for City A and a different hospital for City B. The device can use a location-determining subsystem (e.g. GPS positioning or even a coarser technique like cell tower ID) to determine which city the user is presently in. The device would then automatically switch the emergency contact information based on the current location of the device. In other words, location-dependent emergency information can be dynamically updated to ensure that the most geographically relevant emergency information is presented to a first responder.

In another variant, the location-dependent emergency information may be presented in different languages depending on the current location of the device. In other words, the language used to present the emergency information can be dynamically updated based on the current location of the device. The device can use GPS, radiolocation, cell tower ID or any other location-determining means to determine its current location. The device can then compare its location to a geographical information database to determine the language spoken by the local population in the country, region or city corresponding to the current location of the device. The device can then automatically translate the emergency information into the local language. For example, if the device detects that it is in Italy, then the device in this particular implementation will translate the stored emergency information into Italian so that a first responder will be able to fully comprehend the emergency information stored in the device. In one implementation, contact names would stay the same (remain in their native, default language) but the field labels used to describe the contacts would be automatically translated. Appropriate country codes or international dialing prefixes could be added automatically. In some cases, the current location may correspond to more than one local language. In those cases, a "change language" option can be presented onscreen to enable the first responder to switch to a more familiar language if desired.

Figure 4:
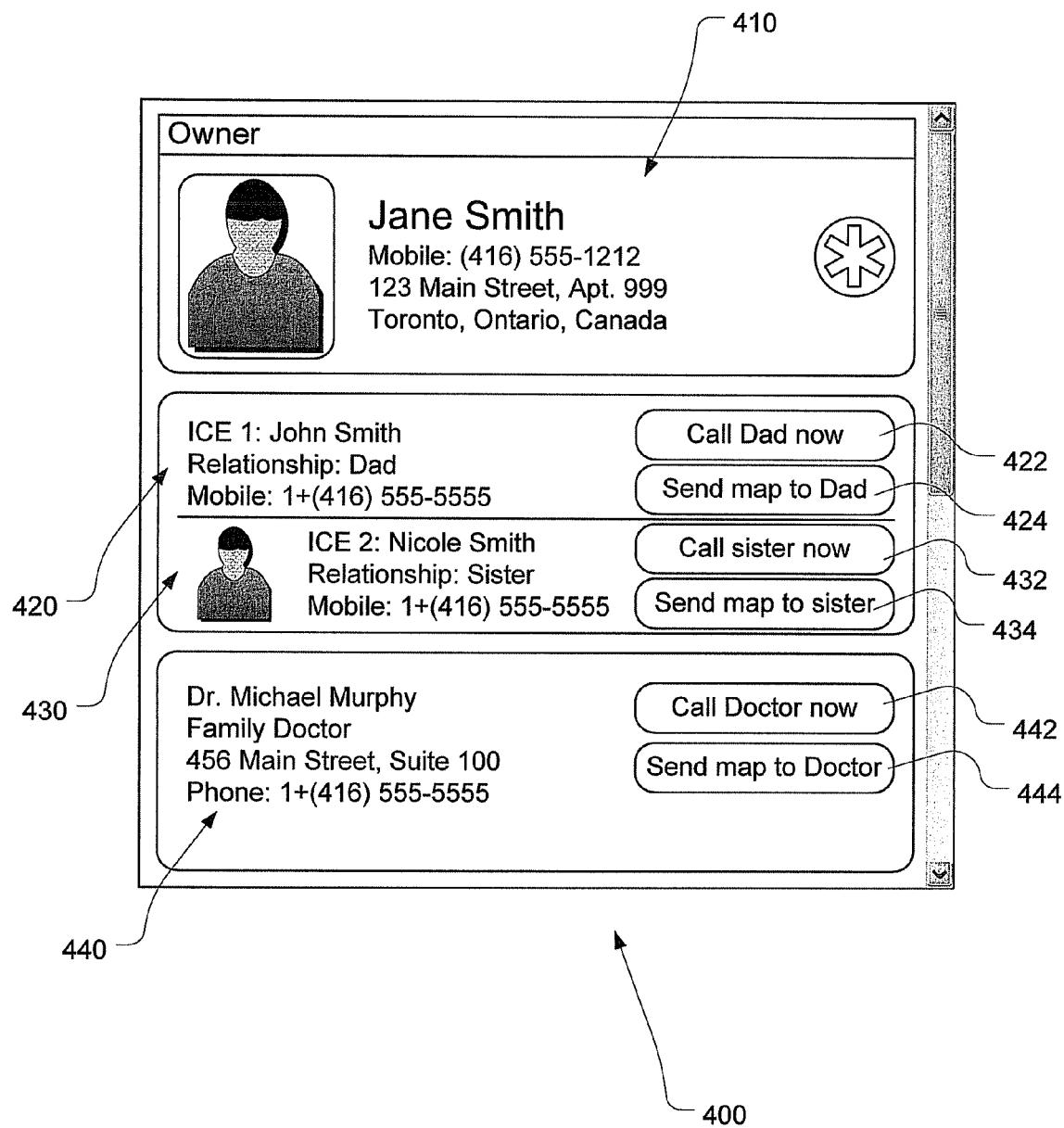
FIG. 4 schematically depicts, by way of example, an emergency information screen (or an "In Case of Emergency" Screen) showing owner information, contact information for two emergency contacts, and contact information for the owner's doctor, as well as user interface elements for sending maps to the emergency contacts or to the doctor.
Figure 5:
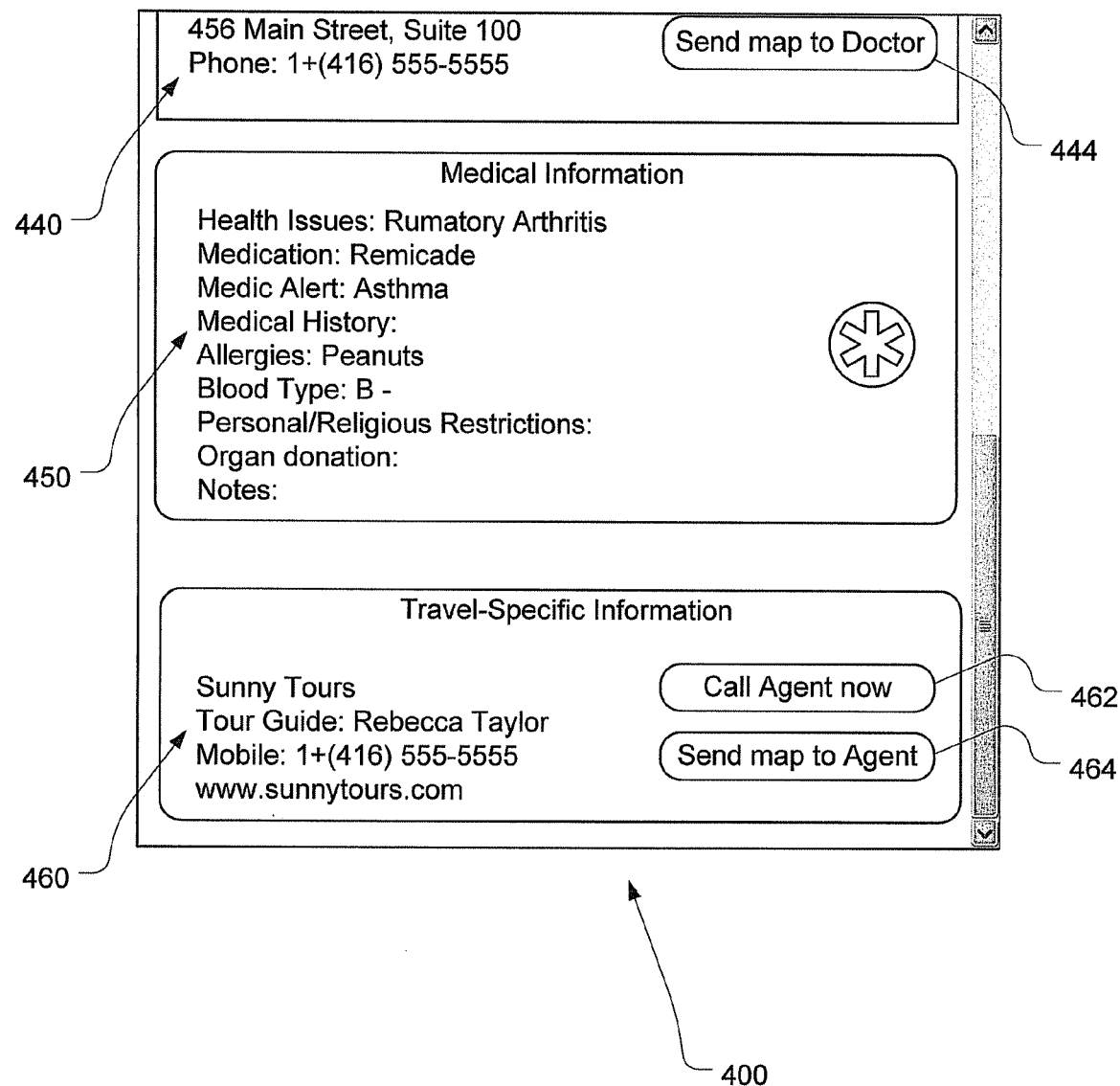
FIG. 5 schematically depicts, by way of example, the emergency information screen of FIG. 4 after scrolling down to reveal additional emergency information including medical information and travel-specific information, the screen furthermore presenting a user interface element for sending a map to a tour guide or travel agent.

In use, assuming the wireless communications device is locked out when the first responder arrives on the scene, the first responder will realize that the person in distress is the owner of an ICE-equipped wireless communications device. The first responder will recognize that the device contains ICE information either due to an external sticker on the case of the device or by virtue of a watermark or icon showing on the main login screen. The first responder clicks on the "Emergency Contacts" (or "Emergency Information") button 310 of the login screen as shown in FIG. 3. This button 310 is linked to an ICE information screen 400 presented by way of example in FIG. 4 and FIG. 5. The ICE information screen (or "emergency information screen") 400 shown by way of example in FIGS. 4 and 5 presents all or a subset of the emergency information entered into the device. The Star of Life or other icon may be depicted on this screen to provide immediate visual confirmation to the first responder that he or she has arrived at the correct screen.

As shown in FIG. 4, some key owner information 410 is presented to help identify the person in distress, i.e. the owner or user of the device. A photograph may be included to help identify the person in distress (the device owner). During setup, the device (if equipped with a digital camera) may instruct the owner how to take a self-portrait for the purposes of incorporating a digital photograph into the owner information portion of the ICE information screen 400. In addition, the owner's name, mobile number, address or other information can be provided to further help identify the owner.

As further shown in FIG. 4, the emergency information includes at least two contact persons (ICE 1 designated by 420 and ICE 2 designated by 430), i.e. a main contact and at least one alternate contact. Although only two contacts 420, 430 are shown in the figure, it should be appreciated that the device may display three or more contacts. The relationship between the owner and each of the contacts can be provided as well (e.g. "Dad" or "Sister"). A user interface element "Call Dad now" 422 is presented to enable the first responder to speed dial the owner's father. A second user interface element "Call sister now" 432 enables the first responder to speed dial the owner's sister as an alternate contact. In addition, a user interface element 422 is provided which, when selected, causes the device to send a map (or other location information) to the main emergency contact (in this example, the Dad). Another user interface element 434 is presented which, when selected, causes the device to send a map (or other location information) to the alternate emergency contact (in this example, the sister). These user interface elements can be soft keys (buttons, links, menu items, toggles, etc.) or dedicated hard keys on the device. In a variant, the device can be configured so that there is a single user interface element which when selected causes the device to send the map or other location information over the data channel to the designated emergency contact while substantially simultaneously initiating a telephone call over the separate voice channel to the same designated emergency contact. In another variant, the device may be configured to send a further e-mail to each of the emergency contacts (or next of kin) providing the name and contact information for the doctor, nearest hospital or nearest medical center to enable the next of kin or emergency contacts to rapidly identify which doctor is tending to the owner. For example, for the next of kin arriving at a hospital, except where the patient (device owner) is brought to the Emergency Room (ER), this would enable the next of kin to determine which doctor is likely attending to the patient (device owner).

Optionally, as mentioned above, these contacts can be ordered or prioritized in terms of their proximity to the current location of the device (or they can be manually ordered, if desired). These contacts may also be prioritized in terms of their availability. Their availability can be determined based on a shared calendar, based on calendar information exchanged between next of kin and owner, or by any other means. For example, as part of a data synchronization/reconciliation process, a wireless communications device may obtain shared calendar information from other persons on a periodic basis, thus enabling the device to dynamically re-prioritize the order of the emergency contacts based on their availability. In a more refined variant, the device could take into account both the proximity to the current location and the stated availability. In yet a further variant, the user of the device can specify for each emergency contact a time of day when that contact is likely to be responsive. For example, a certain next of kin may be known to go to bed early every night. Thus, if an accident occurs after that contact's bed time, then the device should not present that contact as the main contact. Similarly, a contact may be unavailable to respond to an emergency during work hours (e.g. an airline pilot). The availability times of each contact person can thus also be manually input by the owner when setting up the ICE application.

In addition to the owner information and the information about the contact persons/next of kin (labelled as ICE 1 and ICE 2 in FIG. 4), the ICE Information Screen 400 may provide doctor information 440 and a speed dial button (or other user interface element) 442 to initiate a voice call or other communication with the listed doctor (or his pager or his office, hospital, clinic, etc.). As further depicted, a user interface element 444 is presented which, when selected, causes the device to send a map (or other location information) to the doctor or other medical professional identified on the emergency information screen. In a variant, the device can be configured so that there is a single user interface element which when selected causes the device to send the map or other location information over the data channel to the designated medical contact while substantially simultaneously initiating a telephone call over the separate voice channel to the same medical contact. In another variant, the device can be configured to also send a further e-mail (or other communication) to the doctor to provide the names of the emergency contacts (or next of kin) who may be coming to the hospital or clinic in response to the emergency.

As depicted in FIG. 5, medical information 450 can be presented. This medical information can present important information about allergies, medications that the owner is currently taking, blood type, personal/religious restrictions on blood transfusions, resuscitation, etc. or organ donation preferences, to name but a few. As further depicted in FIG. 5, travel-specific information 460 may also be presented where appropriate. If the owner is not traveling, this section may be suppressed or greyed out. Where the owner is traveling, the device may present a user interface element 462 which when selected causes the device to initiate a voice call to the tour guide or travel agent listed in the travel-specification information section. As further depicted, the device may also have a user interface element 464 which when selected causes the device to send a map (or other location information) to the tour guide or travel agent. In a variant, the device may have a user interface element which when selected causes the device to dial the local consulate or embassy. A user interface element can be provided to enable a map (or other location information) to be transmitted to the local consulate or embassy. In another variant, the map may be transmitted along with medical information. In another variant, the sending of the map may be triggered automatically when the emergency call is made.

FIG. 5 schematically depicts, by way of example, the emergency information screen of FIG. 4 after scrolling down to reveal additional emergency information (namely the medical information and the travel-specific information). In other words, in the example presented in FIG. 4 and FIG. 5, the first responder can view all portions of this emergency information by scrolling up and down. Alternatively, the information can be presented by category of information on discrete pages with a main page linked hierarchically to each of the different categories (pages) of information for easy navigation.

In the foregoing example, the first responder is confined to either calling the dad or the sister using the two user interface elements 422, 432 displayed onscreen. In another implementation, once the first responder has called or attempted to call the main contact person and the first alternate contact person listed on the screen, the first responder may wish to send emails, instant messages, or PIN messages to these individuals, or to make further telephone calls to other alternate (backup) contacts. This can be accomplished by providing a full menu of other communication options such as, for example, options for emailing, sending a PIN message, pulling up further alternate contacts, etc. Indeed, to maximize the potential benefit of this novel technology, the owner/user should designate as many alternate contacts as possible. The designation of emergency contacts can be done expeditiously via the address book by simply checking off the contacts who are to be designated as emergency contacts.

In one implementation of this novel technology, the device 100 designates a complete roster of potential contact persons in the address book for sharing with an ICE application that manages the emergency information screen. A complete roster of potential emergency contacts comprises the main contact, the first alternate contact and multiple alternate contacts in the event that the main contact and the first alternate contact are unavailable or unresponsive to the call from the first responder. A complete roster of emergency contacts can be created by designating contacts stored in the address book by using one or more predetermined designations. The predetermined designations can be an abbreviation or acronym such as ICE1, ICE2, ICE3, ICE4, ICE5, etc. or any other suitable word, combination of letters, combination of symbols or indicator. For example, an asterisk (*) can be used to designate the emergency contacts, or a series of asterisks (*, , *, **, ***, etc.) can be used to designate contacts from highest precedence to lowest. Whatever symbol, word or letter combination that is used as the predetermined designations, the device can identify the emergency contacts by parsing the data in the address book, i.e. searching for the predetermined designation(s). When a predetermined designation is found, the device flags the contact as being a designated emergency contact and then transfers the contact information to the emergency information screen or to the ICE application for managing the emergency information screen. The device can then poll the address book to ascertain whether any updates to the contact information need to be transferred over the emergency information screen or ICE application.

Thus, in one example implementation, there could be a plurality of emergency contacts (e.g. 5-10) defining a complete roster of potential contacts who are continually dynamically re-prioritized depending on location, time of day and stated availability. If the main contact is unresponsive, then the first responder can try the alternate contact. Even if only two emergency contacts are presented onscreen, as is the case in the present example, the first responder can optionally obtain further alternate contacts using this menu 1500. In a variant, the device can intelligently and dynamically update the contacts if the telephone call goes unanswered. If the call is unanswered, the device can then automatically select the next alternate contact from the list of emergency contacts, again based on the whatever filters are in place, e.g. location-based filters, time-based filters or availability-based filters. In any event, the device can automatically push this information to the ICE application when an emergency phone call goes unanswered. The first responder merely has to select the speed dial button for the next alternate contact. If the next alternate contact does not respond, the device keeps going down the list of alternate contacts until one does respond (or until the list is exhausted, in which case the device can optionally cycle back to the top of the list so that the first responder can then retry the main contact, the first alternate contact, etc.)

Figure 6:
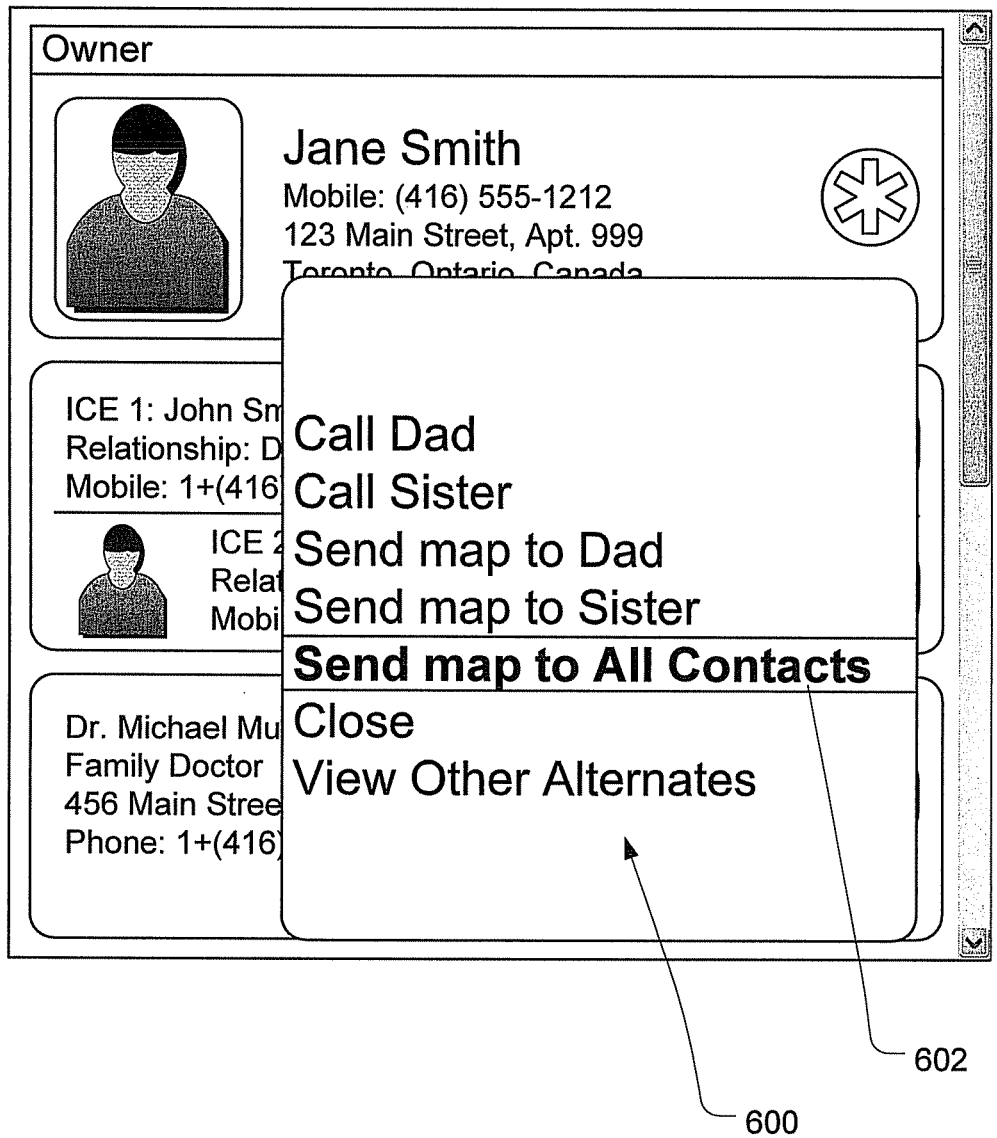
FIG. 6 schematically depicts an example of a menu superimposed over the emergency information screen shown in FIG. 4 and FIG. 5, the menu providing options to send maps to individual emergency contacts or to all contacts simultaneously.

FIG. 6 schematically depicts an example of a menu 600 superimposed over the emergency information screen shown in FIG. 4 and FIG. 5. The menu 600 presents options to send a map to individual emergency contacts ("Send map to Dad", "Send map to Sister"). The menu 600 also presents an option 602 to send the same map to all emergency contacts simultaneously. In this case, the map may be accompanied by an e-mail or some other textual message (either embedded in or overlaid on the map) indicating that the owner is in distress. Where the map is broadcast to a complete roster of emergency contacts, the names and contact information for the main and alternate contacts can be provided to the backups (the others in the roster) to enable them to coordinate the emergency response amongst themselves. In other words, the device may provide an option to "notify all" or "contact all" by sending a group e-mail or by sending a common text message (e.g. SMS, MMS) to a group of contacts (e.g. the entire roster of ICE contacts). The mode of communication may be selected based on device capability to ensure all contacts are able to receive the emergency message. A general notification e-mail (or other such communication) enables the first responder to efficiently advise all emergency contacts without having to send sequential individual communications.

Figure 7:
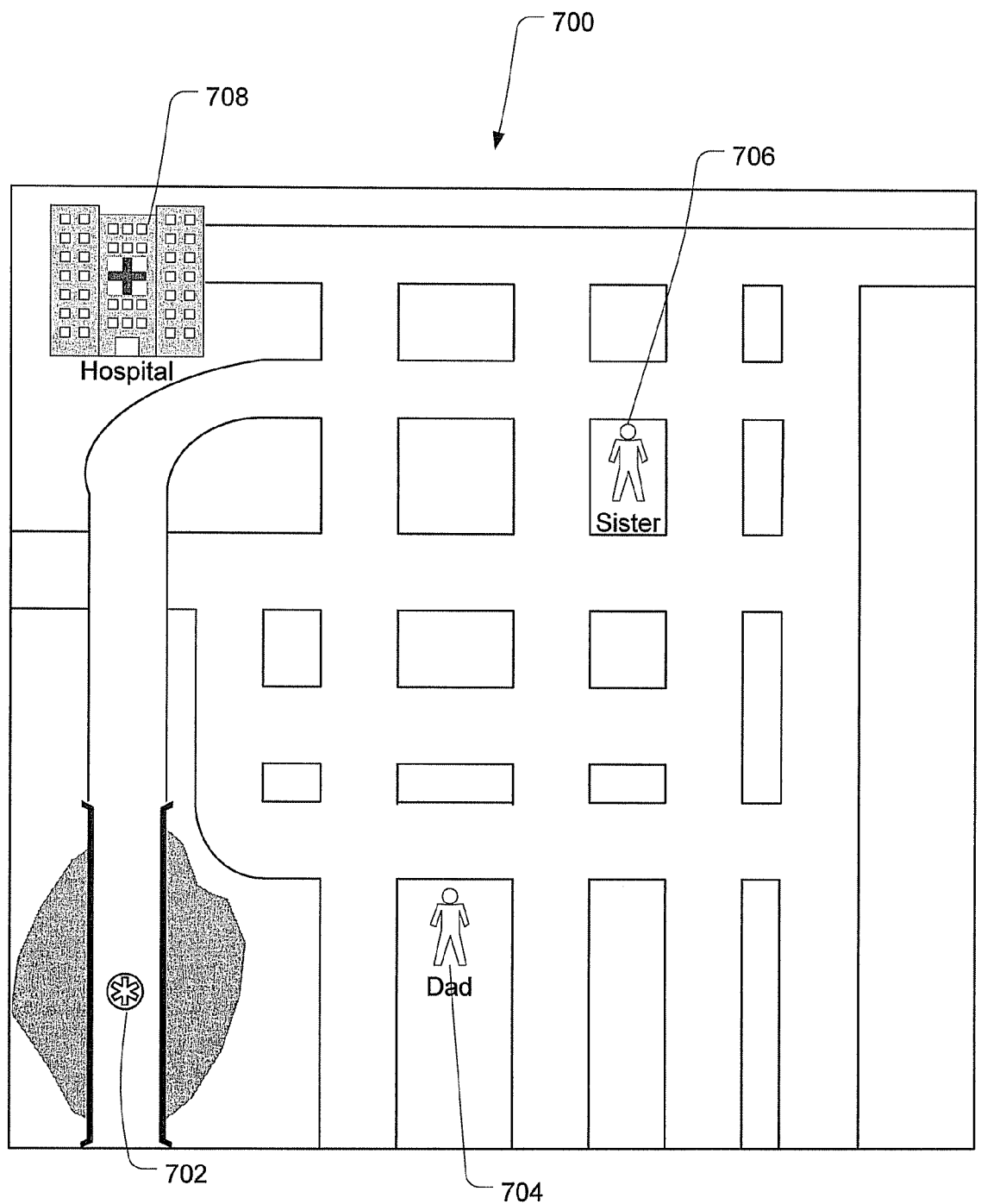
FIG. 7 schematically depicts an example of a map generated on the device for the benefit of the first responder, showing the current location of the device, the locations of the emergency contacts and the location of the nearest medical service provider or hospital.

FIG. 7 schematically depicts an example of a map 700 generated on the device for the benefit of the first responder, showing the current location 702 of the device, the locations 702, 704 of the emergency contacts and the location 708 of the nearest hospital. In this example, the Star of Life is used to depict the current location of the device (where the injury, accident, etc. has arisen). In this example, person icons or stick-figure icons 704 and 706 are used to depict the locations of the main emergency contact (the Dad) and the first alternate contact (the sister). Optionally, these icons can be labelled as shown with the name of the emergency contact or their relationship to the device owner. As depicted by way of example, the map 700 may include the location 708 of the nearest hospital (or the location of a hospital designated by the device owner). The hospital can be designated optionally using a glyph, icon or other symbol (e.g. a building icon, a capital H, a cross, etc.) and may optionally include a label (such as, for example, the name of the hospital, e.g. Blessed Mary Medical Center). The map 700 may also include street names, addresses, points of interest, a scale, cardinal directions, etc. The map 700 may also include rollover graphics (information that is displayed when the cursor, crosshairs, or other pointer hovers over a point on the map. For example, by rolling over the hospital icon, the address and phone numbers are displayed. By rolling over the Star of Life, the nearest street address is displayed. By rolling over the locations of the emergency contacts, their street addresses can be displayed.

Figure 8:
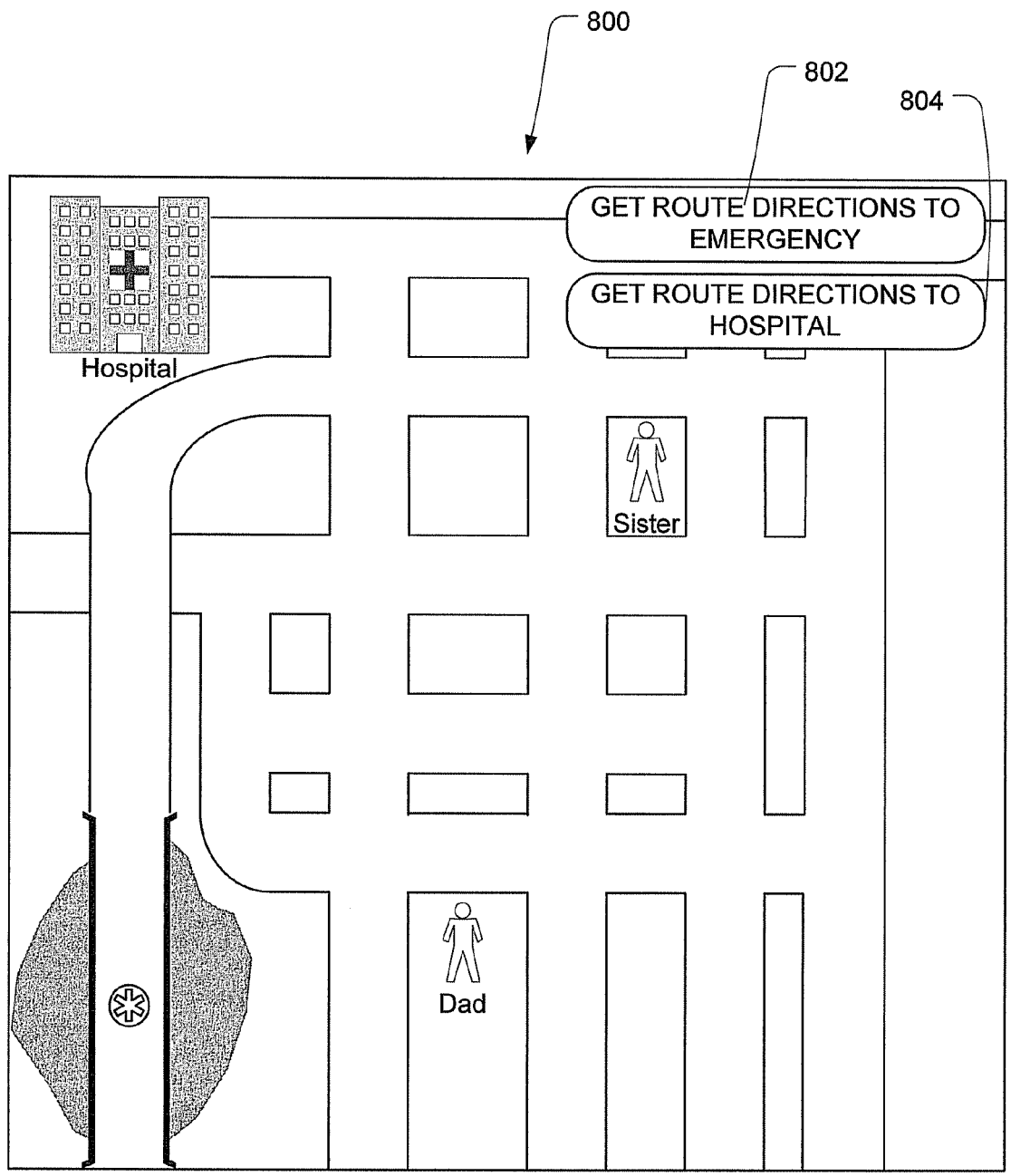
FIG. 8 schematically depicts an example of a map sent to one or more emergency contacts, showing the current location of the device, the locations of each of the emergency contacts and the location of the nearest hospital, and furthermore displaying user interface elements for obtaining route directions to the site of the emergency (i.e. the current location of the device) and for obtaining route directions to the hospital.

FIG. 8 schematically depicts an example of a map 800 sent to one or more emergency contacts, showing the current location of the device, the locations of each of the emergency contacts and the location of the nearest hospital, as explained above. Furthermore, as depicted in this figure, the map displays a user interface element 802 for obtaining route directions (e.g. from a route server) to the site of the emergency (i.e. the current location of the device) and a user interface element 804 for obtaining route directions (e.g. from the same or a different route server) to the hospital. In a variant, a user interface element can be provided which when selected causes the device to receive position updates from the owner's device and to present dynamically updated route directions to the dynamically changing current location of the owner's device.

In another implementation, the device can be configured such that when an emergency number is dialed (e.g. 911, 999, 112, etc.), the map or location information is sent to the designated emergency contacts along with a textual indication that an emergency situation has been signaled from that location. In other words, if the first responder's reflex is simply to call 911, then the device will automatically transmit to each emergency contact a map of the current location along with a pre-generated message that the device has signaled an emergency situation.

In another implementation, the device can be configured to initiate a phone call to the nearest hospital (optionally with a pre-recorded message) or to send an e-mail or other form of communication to the hospital. The call or communication may optionally provide an estimated time of arrival at the hospital and/or the route being taken by the first responder and the device user (or the route suggested by the device that is computed to be the fastest route to the hospital). The device can also be configured to send a separate communication to each emergency contact to suggest a route to the hospital.

From the foregoing, it should be apparent that the innovative technology presented herein provides unparalleled assistance to a first responder in the case of an emergency involving the owner of the device. By providing location information such as maps to the first responder and/or to the emergency contacts, the first responder and the emergency contacts.

The method steps disclosed in the present specification can be implemented as coded instructions in a computer readable medium. In other words, the computer readable medium contains software code to perform the foregoing steps when the computer readable medium is loaded into memory and executed on the microprocessor of the wireless communications device.

While the ICE information is stored in the memory of the device, the emergency information can also be backed up wirelessly and automatically by periodically transmitting updated information from the device to a server, e.g. to an enterprise relay server or dedicated ICE server to which the device can offload some or all of the ICE-related data and functions. Furthermore, in another implementation, the emergency information can be stored at a web server to enable emergency contacts to access that information using a web browser. For example, the device could send a link to the website which the emergency contact person accesses (e.g. using a pre-arranged password) in order to obtain all the needed emergency information about the owner of the device. Updates about the device owner's current location, current status, etc. can be pushed to the web server rather than disseminated to each emergency contact.

This new technology has been described in terms of specific implementations and configurations which are intended to be exemplary only. The scope of the exclusive right sought by the Applicant is therefore intended to be limited solely by the appended claims.

The invention claimed is:

1. A method for a wireless communications device to provide access to emergency contact information, the method comprising:
   determining a current location of the wireless communications device;
   determining a local language based on the current location; and
   displaying an emergency information screen in the local language that presents user designated emergency contacts and a user interface element for communicating with one or more of the user designated emergency contacts, wherein the user designated emergency contacts are dynamically re-prioritized based on proximity to the current location.

2. The method as claimed in claim 1 further comprising sending current location information to the one or more user designated emergency contacts in response to user input received by the user interface element.

3. The method as claimed in claim 2 further comprising:
   periodically updating the current location information; and
   automatically sending updated current location information to the one or more user designated emergency contacts.

4. The method as claimed in claim 1 wherein the user interface element causes the device to display current location information on a display of the device.

5. The method as claimed in claim 1 further comprising:
estimating a travel time between the current location of the device and the location of each of a plurality of user designated emergency contacts; and
prioritizing the plurality of user designated emergency contacts based on travel time to the current location of the device.

6. The method as claimed in claim 1 further comprising providing a user interface element which when selected causes the device to obtain map data and render a map of the current location of the device.

7. The method as claimed in claim 6 further comprising displaying the nearest hospital on the map.

8. The method as claimed in claim 6 further comprising displaying the nearest user designated emergency contact on the map.

9. The method as claimed in claim 6 further comprising displaying all user designated emergency contacts on the map.

10. The method according to claim 1, wherein the user designated emergency contacts are dynamically re-prioritized based also on time of day.

11. The method according to claim 1, wherein the user designated emergency contacts are dynamically re-prioritized based also on stated availability of the user designated emergency contacts.

12. The method as claimed in claim 1 comprising displaying a user interface element to change languages.

13. The method as claimed in claim 1 wherein the displaying of the emergency information screen is in response to selection of a user interface element displayed on a lockout screen of the wireless communications device, and wherein the user designated emergency contacts are accessed while protecting the privacy of all other information stored on the wireless communication device.

14. A non-transitory computer readable medium comprising code which when loaded into memory and executed on a processor of a wireless communications device is adapted to cause the device to perform acts of:
determining a current location of the wireless communications device;
determining a local language based on the current location; and
displaying an emergency information screen in the local language that presents user designated emergency contacts and a user interface element for communicating with one or more of the user designated emergency contacts, wherein the user designated emergency contacts are dynamically re-prioritized based on proximity to the current location.

15. The non-transitory computer readable medium as claimed in claim 14 further comprising code for sending current location information to the one or more dynamically re-prioritized user designated emergency contacts.

16. The non-transitory computer readable medium as claimed in claim 14 wherein the code is further adapted to cause the device to render a map showing the location of each of the one or more user designated emergency contacts and of a hospital that is closest to the current location of the device.

17. A wireless communications device comprising:
a processor operatively coupled to a memory for receiving and storing emergency contact information for one or more user designated emergency contacts;
a location-determining subsystem for determining a current location of the device; and
a display operatively coupled to the memory and processor for displaying an emergency information screen in a local language determined by the processor based on the current location, wherein the emergency information screen presents user designated emergency contacts and a user interface element for communicating with one or more of the user designated emergency contacts, wherein the user designated emergency contacts are dynamically re-prioritized based on proximity to the current location.

18. The device as claimed in claim 17 further comprising a user interface element for generating a map of the current location.

19. The device as claimed in claim 17 further comprising a user interface element for generating a map of a location of each of the one or more user designated emergency contacts.

20. The device as claimed in claim 17 further comprising a user interface element for generating a map of a location of a hospital closest to the current location of the device.

21. The device as claimed in claim 17 wherein the location information sent by the device comprises a map showing the current location of the device and a user interface element for obtaining route directions to the current location of the device.

22. The device as claimed in claim 17 wherein the location information sent by the device comprises a map showing the current location of a hospital closest to the current location and a user interface element for obtaining route directions to the hospital.

23. The device as claimed in claim 17 wherein the display displays emergency contact information for the one or more user designated emergency contacts.

24. The device as claimed in claim 17 wherein the display presents a user interface element to change languages.

25. The device as claimed in claim 17 wherein the display displays the emergency information screen in response to selection of a user interface element displayed on a lockout screen of the wireless communications device, and wherein the user designated emergency contacts are accessed while protecting the privacy of all other information stored on the wireless communication device.

* * * * *